April 28, 1970 J. R. PENNINGTON 3,508,620
EXCAVATION APPARATUS
Filed Jan. 2, 1968 11 Sheets-Sheet 1

INVENTOR
JAMES R. PENNINGTON
BY
Ernest A. Polin
ATTORNEY

INVENTOR
JAMES R. PENNINGTON
BY
Ernest A. Polin
ATTORNEY

April 28, 1970  J. R. PENNINGTON  3,508,620
EXCAVATION APPARATUS
Filed Jan. 2, 1968  11 Sheets-Sheet 7

INVENTOR.
JAMES R. PENNINGTON
BY
ATTORNEY

INVENTOR.
JAMES R. PENNINGTON
BY
ATTORNEY

April 28, 1970   J. R. PENNINGTON   3,508,620
EXCAVATION APPARATUS
Filed Jan. 2, 1968   11 Sheets-Sheet 9

INVENTOR.
JAMES R. PENNINGTON
BY
ATTORNEY

April 28, 1970    J. R. PENNINGTON    3,508,620
EXCAVATION APPARATUS

Filed Jan. 2, 1968    11 Sheets-Sheet 10

INVENTOR.
JAMES R. PENNINGTON
BY
ATTORNEY

United States Patent Office

3,508,620
Patented Apr. 28, 1970

---

1

3,508,620
EXCAVATION APPARATUS
James Ronald Pennington, Basking Ridge, N.J., assignor to Allied Chemical Corporation, New York, N.Y., a corporation of New York
Continuation-in-part of application Ser. No. 490,240, Sept. 27, 1965. This application Jan. 2, 1968, Ser. No. 700,319
Int. Cl. E21c 23/00
U.S. Cl. 175—53                                10 Claims

ABSTRACT OF THE DISCLOSURE

This invention is directed to apparatus for driving raises through rock structures. The apparatus broadly comprises a preferably spherical drill head rotatably suspended from a flexible cable. Other flexible cables drawn behind the drill head supply power and coolant for the drill head. The spherical drill head comprises two hemispheres rotatably driven in opposite directions by one or more motors carried within the drill head. On each hemisphere are mounted roller cutters so positioned that, on rotation of the hemispheres and contact of the drill head with a surface to be drilled, rotation of the entire drill head occurs substantially about an axis extending through its center and the point of suspension of the head. Other drill head shapes besides spherical can also be used; for example, ellipsoidal and cylindrical drill heads can also be used. If the drill head is mounted on conventional driving and cuttings-removal equipment, it can also be used without the pilot hole and flexible cable to drive horizontal passages.

CROSS REFERENCE TO RELATED APPLICATION

This application is a continuation-in-part of copending U.S. application Ser. No. 490,240, filed Sept. 27, 1965 by James R. Pennington, now abandoned.

This invention relates to method and apparatus for driving underground raises, tunnels and similar excavations.

In mining operations, it is often necessary, for purposes such as ventilation, or transfer and stope development, to drive a raise from a lower level drift, gallery or stope to an upper level. Such operations have been effected, by substantially all-mechanical procedures, by use of a system involving boring by so-called down-drilling pilot hole, updrilling reaming technique, briefly as follows. By means of rotary drilling equipment, a pilot bore of relatively small diameter is drilled from an upper level drift thru the back (roof) of a lower level drift or gallery. The drill head or bit is removed from the lower end of the drill shaft or rod and replaced by a bit of substantially larger cutting diameter and designed for up-drilling. The thrust mechanism of the equipment on the upper level is reversed to provide up-thrust for the drill head attached to the lower end of the drill rod, and by subsequent up-drilling, a raise, of cross-section substantially corresponding to the diameter of the drill head fixed to the lower end of the rotary drill shaft, is bored out by what amounts to a reaming operation.

SUMMARY OF THE INVENTION

This invention is directed to apparatus and method improvements in underground boring operations of the foregoing type. More specifically this invention is directed to a cable-suspended spherical drill head comprising two hemispheres, the drill head containing motor means rotating the hemispheres in opposite directions.

2

On the surface of each hemisphere are mounted roller cutter means so positioned as to cause the drill head to rotate about its point of suspension while drilling is in progress.

It is an object of this invention to provide novel apparatus for drilling raises and other passages in rock structures.

It is also an object of this invention to provide apparatus for drilling raises in rock structures which can be suspended from a flexible cable so as to avoid the problem of binding of drill strings in pilot holes.

It is a further object of this invention to provide apparatus for drilling raises in rock structures which apparatus does not require extensive preparation of the site to which the raise is being drilled.

Other and further objects of this invention will be apparent to those skilled in the art from the following description taken in connection with the accompanying drawings in which.

Figure 3:
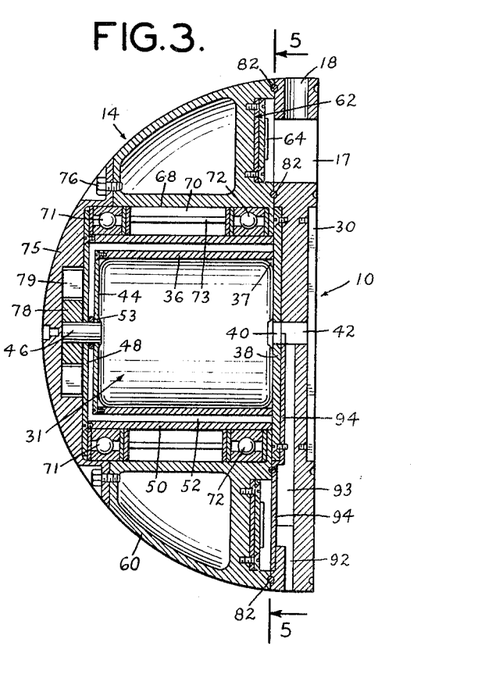
FIG. 3 is a vertical section of the center plate and a vertical section of an attached cutter-supporting hemisphere, the section of the hemisphere being on the line 3—3 of FIG. 5.
Figures 8, 9, 10:
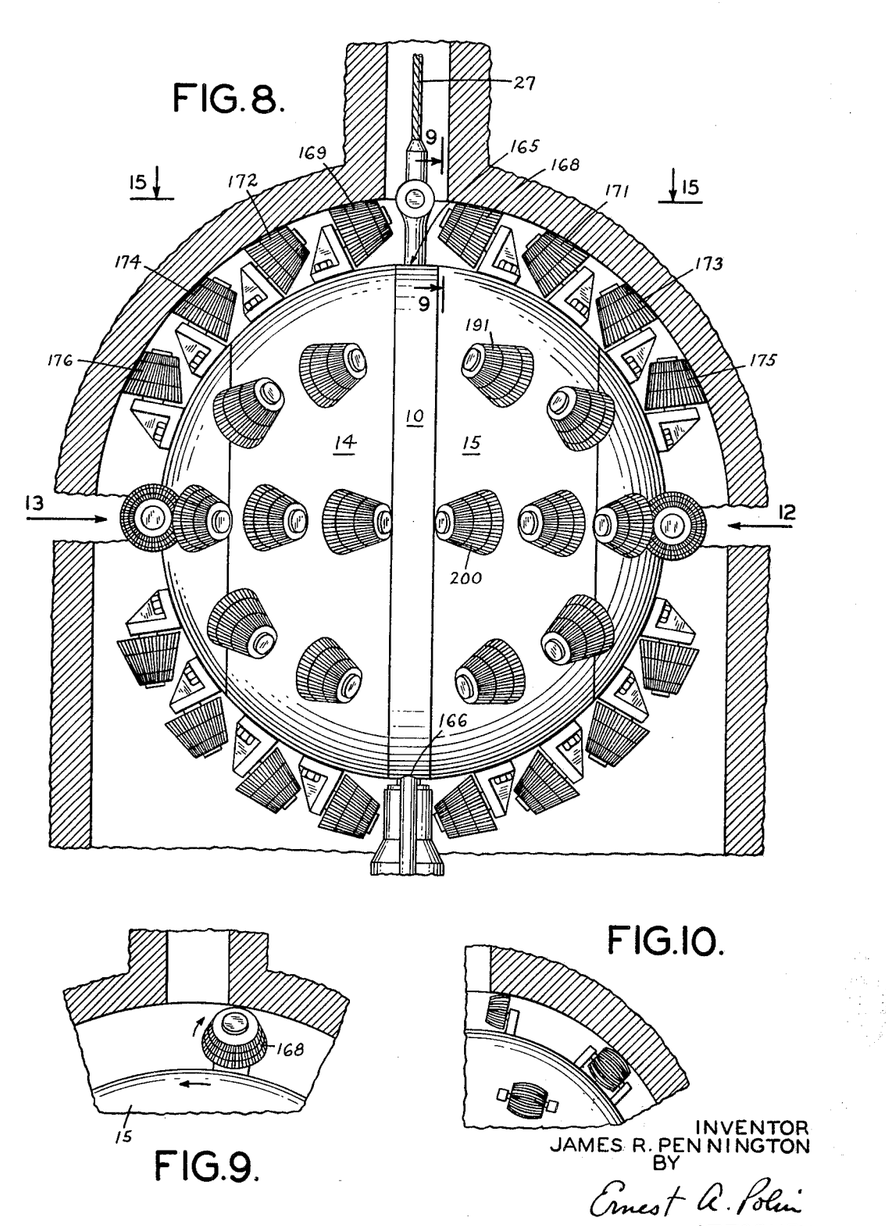
FIG. 8 indicates in vertical section a rock formation thru which a raise is being drilled, and shows in elevation the spherical drill of the invention and an arrangement of cutters as mounted on the convex surfaces of each of the cutter-supporting hemispheres.
FIG. 9, taken on the line 9—9 of FIG. 8, shows a detail partly in elevation and partly in vertical section.
FIG. 10 illustrates a modified type cutter.

The integrally-powered spherical drill of the invention comprises principally a center plate or disk 10 having rotatably attached, on opposite parallel faces 11 and 12, cutter-supporting hemispheres 14 and 15, FIGS. 3 and 8.

Figure 1:
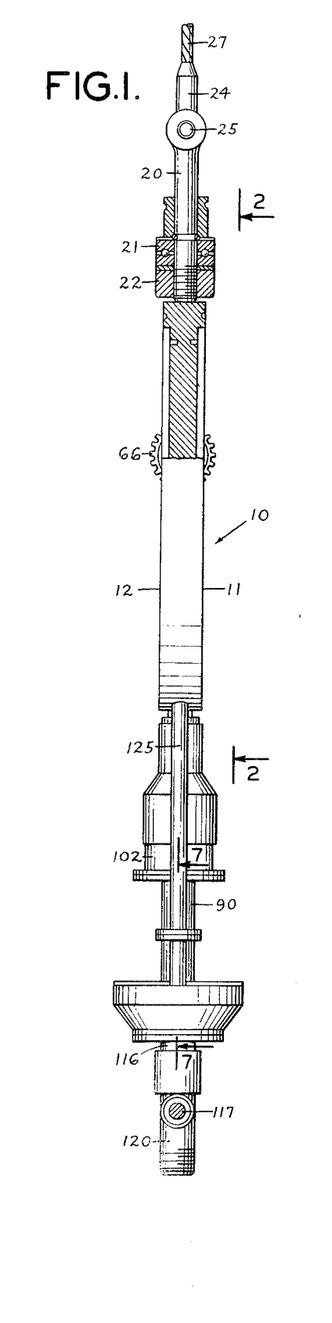
FIG. 1 is a view, partly in vertical section and partly in vertical edge elevtaion, of a substantially circular center plate or disk, together with associated equipment.

Center plate 10 is machined and drilled out at 17 and 18, FIG. 3, to accommodate a king pin 20, FIG. 1, a bearing 21 and a nut 22 threaded to the lower end of the king pin. By means of a socket 24 and a pin 25 connected to the king pin 20, center plate and associated hemispheres are supported in operation by a suitable connecting element or means, preferably a flexible wire cable 27.

Figures 2, 6:
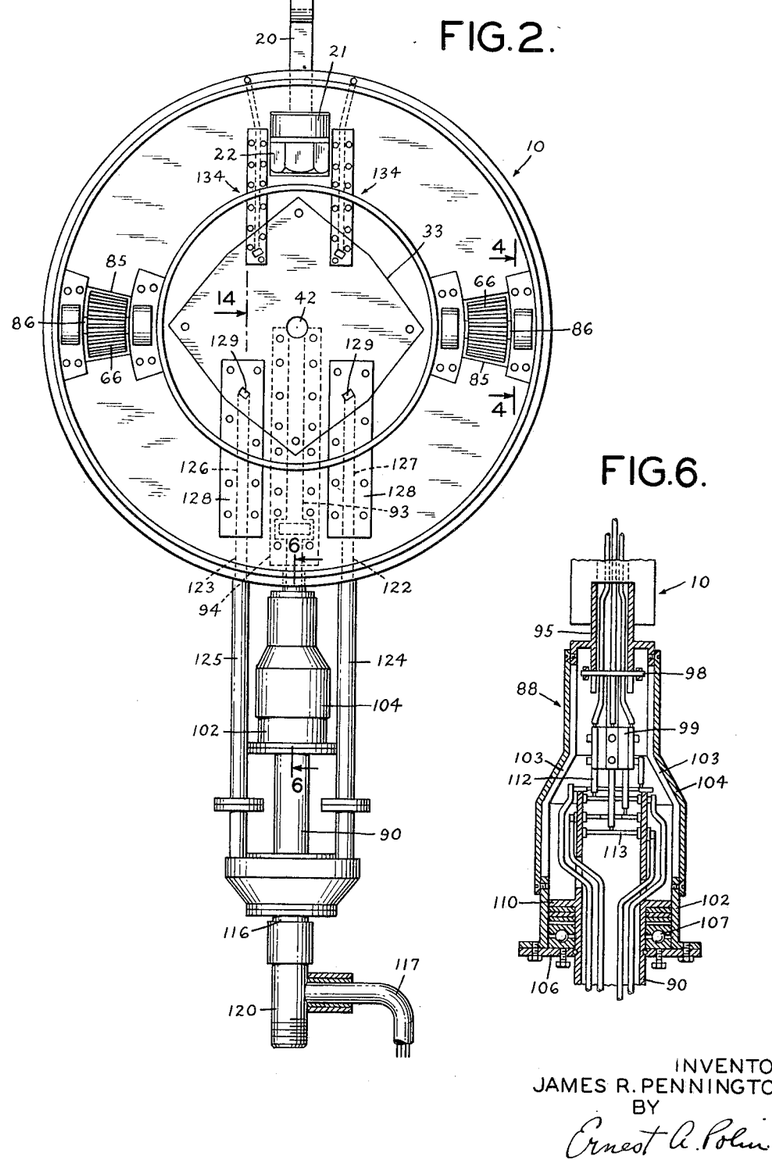
FIG. 2 is an elevation of the center plate taken on the line 2—2 of FIG. 1.
FIG. 6 is an enlarged vertical section, taken on the line 6—6 of FIG. 2, of an electrical energy and cooling water supply header.

Each face of plate 10 is recessed as at 30, FIG. 3, to facilitate rigid attachment to the plate of a motor 31, the recess appearing in elevation as indicated by the octagonal figure 33, FIG. 2. A cylindrical inner motor housing 36, FIG. 3, is welded at one circumferential end as at 37 to a vertically disposed motor mounting plate 38 having a thickness equal to the depth of center plate recess 30 and having a peripheral configuration corresponding to the octagonal delineation 33, FIG. 2. The motor mounting plate is drilled centrally to provide a circular opening 40, FIG. 3, which registers with a similar short circular conduit 42 cut thru the center disk 10. Motor plate 38 is attached to center plate 10 and motor 31 to motor plate 38 by suitably disposed countersunk screws. The outer end of inner housing 36 is closed liquid-tight by a cover 44 having an axial circular cut-out to accommodate the outerward extension of motor shaft 46, motor 31 and inner housing 36 being designed so that the motor casing fits snugly within housing 36.

The inner peripheral rim of a cylindrical outer motor housing 50 is welded or otherwise liquid-tight attached to motor mounting plate 38. The periphery of the outer end of outer motor housing 50 is liquid-tight sealed by a cover plate 48 which, similar to cover plate 44, is provided with an axially disposed circular opening for motor shaft 46. The inner diameter of outer motor housing 50 is substantially greater than the outer diameter of inner motor housing 36, and similarly the length of outer motor housing 50 is substantially greater than that of inner motor housing 36, these dimensional differences being such, in accordance with any specific design, as to provide a jacket 52, surrounding the sides and the outer end of the motor, large enough to provide for adequate circulation around the motor of cooling fluid, e.g. water. Within the jacket, motor shaft 46 is provided with a liquid seal 53.

Figure 5:
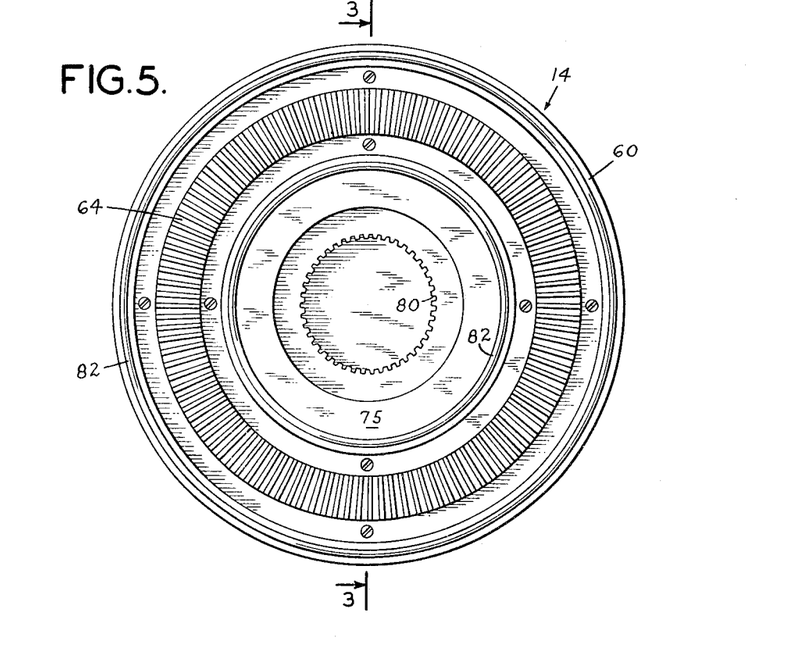
FIG. 5 is an elevation, on the line 5—5 of FIG. 3, of the hemisphere of FIG. 3.

One part of the cutter-supporting surface of hemisphere 14 is provided by an annular shell section 60, FIG. 3, the larger periphery of which appears in circular elevation in FIG. 5. As shown in FIG. 3, shell 60 is formed with an annular channel 62 cut to a depth sufficient to receive a toothed annular gear 64 shown in section in FIG. 3, and in elevation in FIG. 5, recessing of the gear 64 in shell 60 being chosen so that the teeth of gear 64 mesh with the teeth of pinion gears 66, FIG. 1, subsequently discussed. The inner surface of shell section 60 is cylindrical as indicated at 68, FIG. 3. Diameter of this cylindrical surface is designed sufficiently greater than the outer diameter of outer motor housing 50 to provide an annulus 70 between shell 68 and outer motor housing 50 large enough to house bearings 68 and outer motor housing 50 large enough to house bearings 71 and 72 held spaced apart by spreader 73. Cover plate 48 extends radially beyond its attachment to outer motor housing 50 sufficiently to form end support for bearings 71.

A shell cover section 75, circular in elevation as shown in FIG. 5, is attached by cap screws 76 to annular shell section 60. Cover 75 is recessed to receive motor shaft 46 carrying a drive gear 78 which operates planetary gearing, indicated at 79, which meshes with teeth 80, FIG. 5, cut in shell cap 75. Contiguous faces of center plate 10 and hemisphere 14 are provided as at 82, FIG. 3, with complementary O-ring grooves to receive suitable O sealing rings.

Figure 4:
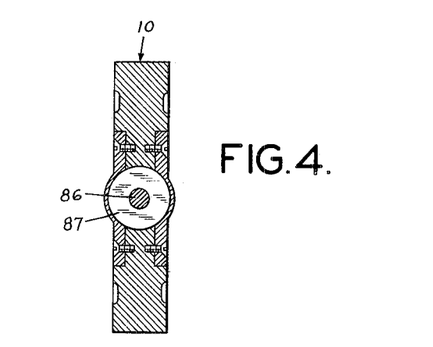
FIG. 4 is a vertical section of a detail taken on the line 4—4 of FIG. 2.

Set within cut-outs 85, FIG. 2, in center plate 10 are pinion gears 66 fixed on shafts 86 which are rotatable in bearings 87, particular fabrication of which is apparent from FIGS. 2 and 4. As above indicated, pinion gears 66, FIGS. 2 and 1, are positioned to mesh with ring gear 64, FIGS. 3 and 5. The complementary cutter-supporting hemisphere 15, FIG. 8, is of construction duplicating that of the hemisphere 14 described in connection with FIG. 3. On operation of the motor 31, FIG. 3, thru shaft 46 drive gear 78 and planetary gearing 79, hemisphere 14 is rotated about the axis of motor shaft 46 while center plate 10 remains non-rotatable except about the axis of cable 27. In view of the described construction and arrangement of pinion gears 66 which mesh with the ring gear 64, FIG. 3, and with the corresponding ring gear not shown on hemisphere 15, it will be understood that hemispheres 14 and 15 are keyed together to maintain rotation of the same at identical r.p.m.s although in opposite directions.

Figure 7:
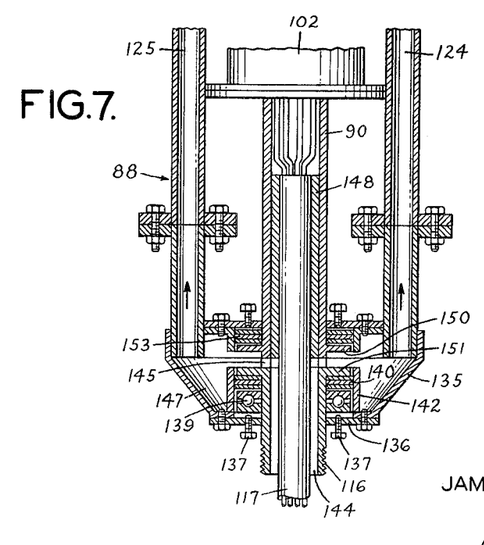
FIG. 7 is an enlarged vertical section of the header taken on the line 7—7 of FIG. 1.

Any suitable type of prime mover, e.g., electric, hydraulic, pneumatic or otherwise, may be employed. A single prime mover designed to drive the hemispheres as described may be utilized. However, spherical drill of the invention is preferably electric powered, dual motored, and the motors water-cooled. The preferred two-motor embodiment described affords design which facilitates minimization of the thickness of center plate 10 which in turn provides the advantage of minimizing non-cutting area of the drill head sphere. In one preferred use, i.e. drilling raises in mines, the spherical drill as a whole, including the center plate 10 and the hemispheres on either side, rotates about the vertical axis of supporting cable 27. In view of such rotatability and the preferred use of electric power and water cooling, the invention affords mechanisms for electrical and water connections between the rotatable drill sphere and non-rotatable main electrical and water supply lines. FIGS. 6 and 7 illustrate one embodiment of a header, indicated generally at 88, which provides for this objective, e.g. a connection between rotatable center plate 10 and a non-rotating conduit 90 housing electrical conductors.

Referring to FIGS. 2 and 3, the face of center plate 10 contiguous to the concavity of hemisphere 14 is drilled and routed out as at 92 and 93 to afford electrical conductor passage from the bottom of the center plate, to circular conduit 42, to circular opening 40 and to motor 31, it being understood that in conduit 42 corresponding conductor leads also pass in the opposite direction to the motor in hemisphere 15 not shown in FIG. 3. The routed-out portion 93 is closed off by a suitably formed and recessed cover plate 94. Referring to FIG. 6, cylindrical sleeve 95 is fixedly set into the lower edge of center plate 10 in communication with the drilled passage 92, sleeve 95 being thus rotatable, about the vertical axis of cable 27, with center plate 10. At 98 sleeve 95 provides support for terminal block 99. Rigidly connected to sleeve 95 is a housing 102 which is rotatable with center plate 10 and which is provided with work slots 103 and slot cover 104. An annular disk 106 attached to the lower end of rotatable housing 102 affords support for bearing 107. Nonrotatable conduit 90 which passes, via on O-ring seal, thru annulus 106 is formed with an outwardly projecting flange 110 which, in conjunction with suitable packing and the bearings 107, provides vertical support for conduit 90 and other parts connected thereto. Brush holders 112 project downwardly from terminal block 99 and facilitate, thru a corresponding number of conductive slip rings 113, swivel current connections between the non-rotatable slip rings and the rotatable terminal block 99. Non-rotating conduit 90 extends downwardly and terminates in a threaded end 116, FIG. 7. Individual conductors connected to the slip rings of FIG. 6 merge into a single waterproofed cable 117, FIGS. 7 and 2.

FIG. 7 illustrates one embodiment of a swivel water connection between rotatable center plate 10 and a non-rotating water supply inlet 120, FIG. 2. The lower circumference of center plate 10 is drilled as at 122 and 123, to fixedly receive the upper ends of water supply pipes 124 and 125. Face 11 of center plate 10 is routed out to form elongated cut-outs or channels 126 and 127 which are closed off in the plane of the face 11 of center plate 10 by suitably recessed cover plates 128 each provided near the upper ends with openings 129. Directly behind openings 129, FIG. 2, and in axial alignment center plate 10, and port openings 131 are drilled thru motor support plate 38. Positioning of ports 131 is selected so that these ports register with the lower inner circumference of the liquid cooling jacket 52, FIG. 3. Hence, cooling water is supplied from inlet pipes 124 and 125 thru passages 122 and 123, channels 126 and 127, conduits 130 and ports 131 to the motor cooling jacket 52. Likewise, ports 132 in motor support plate 133, (not shown in FIG. 2 but shown in section of FIG. 14) of hemisphere 15, supply cooling water to the cooling jacket of the motor in hemisphere 15. At the top of FIG. 2, there are shown cooling water outlets, denoted generally by 134, constructed and arranged similarly to the water inlets just described. The ports of these outlets, corresponding with inlet ports 131 and 132, are positioned to register with the upper inner circumferences of the motor cooling jackets of the respective motors. It will be understood that the water jackets may be provided, if desirable, with baffles suitably arranged to afford efficient motor cooling. When in operation, water discharged from outlets 134 runs down over the drill head and flushes out rock cuttings.

Referring to FIG. 7, the lower ends of pipes 124 and 125 project into the upper face of and are fixedly attached project into the upper face of and are fixedly attached to a housing 135, the lower end of which is provided with an annular cover plate 136 carrying screws 137 to facilitate adjustment of bearings 139 and packing 140 positioned in a chamber formed partly by a vertically disposed annular ring 142 integral with housing 135.

It will be recalled from FIG. 6 that electrical cable conduit 90 is non-rotatable. In FIG. 7, incoming water from non-rotatable water inlet connection 120 enters the annular passage 144 formed by the inner circumference of the lower end of conduit 90 and the outer circumference of the waterproofed cable 117, passes thru non-rotatable ports 145 into annular chamber 147, and thence into the lower ends of pipes 124 and 125. Packing 148 seals off water from the electrical conduits. Annular flanges 150 and 151, fixed to non-rotating conduit 90, afford backing for packing 140 and packing 153, which sets of packing together with their associated adjusting screws provide liquid-tight seals between rotatable housing 135 and associated water pipes 124 and 125, and non-rotatable conduit 90 which functions for the lower end of its length as electric cable and cooling water inlet.

While the previously proposed system affords advances toward all-mechanical raise driving, operation is characterized by major disadvantages. For example, the pilot bore, which is required to be of substantial length, must be almost perfectly aligned axially, a factor not easily accomplished, otherwise the drill rods particularly during up-drilling readily bind on the bore walls, especially since a large diameter drill head suspended on the end of a long drill rod has a tendency to move somewhat elliptically about the theoretical axis of the bore, thus enhancing likelihood of drill rod binding in the case of a pilot bore which is only a little out of alignment. The paramount disadvantages of the previous system are inherent in rotary drilling equipment. Relatively long lengths of drill rod must withstand tremendous twisting torque. Consequently rod and coupling failure occur frequently. Torque and pressure required for cutting rock require extremely large and heavy rotary machines to withstand the reactive force and remain stable. Such size also requires extensive site preparation in normally restricted underground workings. The present invention offsets the foregoing and other lesser disadvantages.

Figure 11:
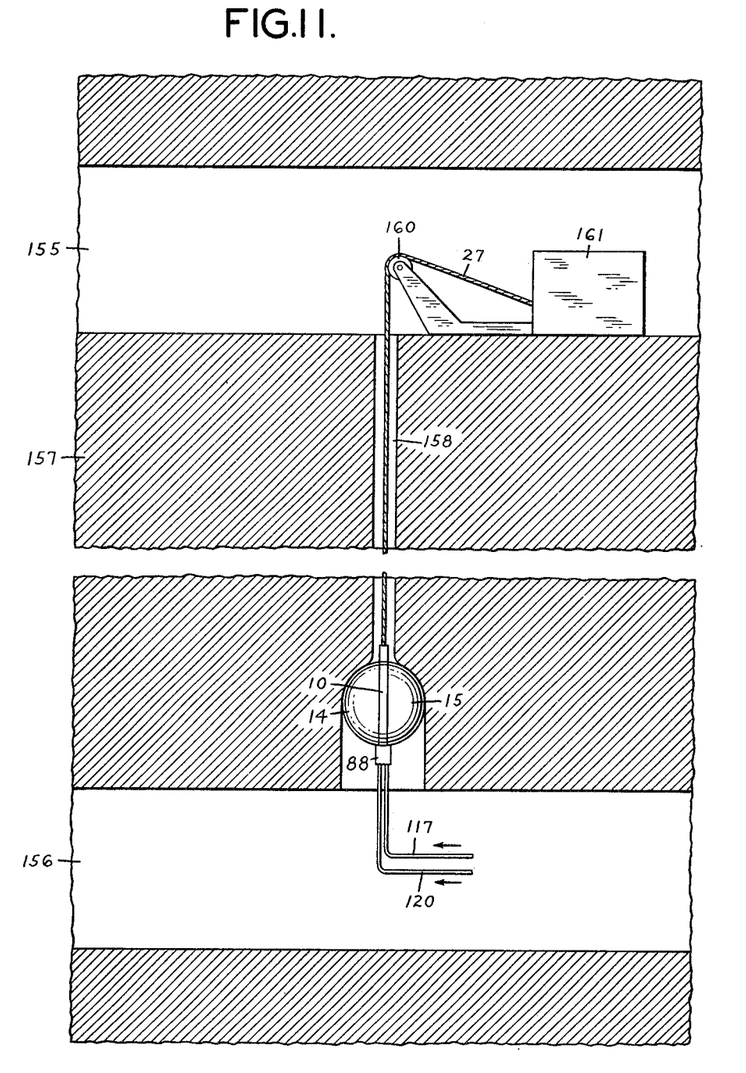
FIG. 11 is a vertical section through a rock formation illustrating practice of the method of the invention.

The system of the invention is illustrated diagrammatically in FIG. 11 showing an upper level gallery 155, a lower level gallery 156, intermediate rock formation 157 and a pilot bore 158 of relatively small diameter. The term "gallery" is used to include a gallery, drift. stope or any similar chamber, and "rock" is intended to include any similar drillable material. Center plate 10 of the integrally-powered spherical drill head is rotatably connected to the lower end of a connecting element such as flexible cable 27 which passes thru the bore, over a suitably supported pulley 160 to winch 161 or other suitable mechanism designed as known in the art to apply controllable tension to the cable to draw the spherical drill head into cutting relation with the rock adjacent the lower end of the pilot bore. Tension applied via cable 27 to the drill head may be regulated as a function of motor loading of drill head motors as measured by an ammeter at the winch station.

Figure 12:
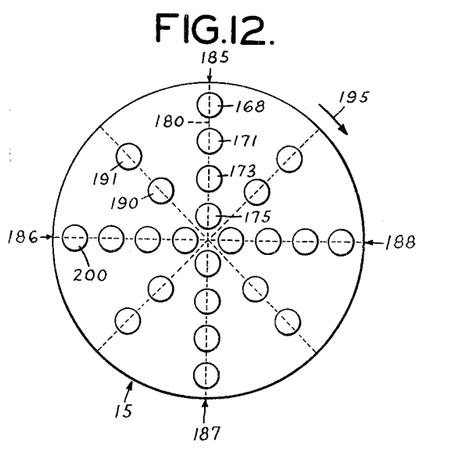
FIGS. 12 and 13 are diagrammatic elevations, on reduced scale, looking in the directions of arrows 12 and 13 respectively, of FIG. 8.
Figure 13:
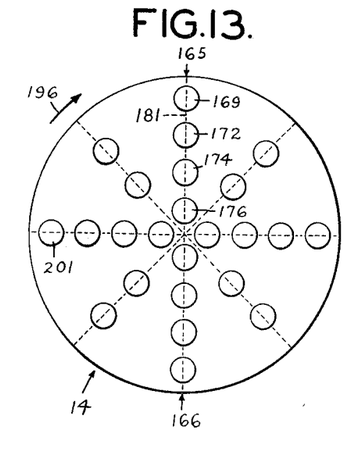

Cutters and disposition of the same on hemispheres are shown in FIG. 8 and in the diagrammatics of FIGS. 12 and 13. In accordance with the invention, design of individual cutters and the arrangement of cutters on the respective hemispheres are such, in conjunction with opposite rotation of the hemispheres as to insure rapidly successive incremental rotation of the drill head about the axis of cable 27 sufficient to provide for cutting away a bead of rock which would remain uncut in the absence of rotation about the axis of cable 27, which bead would have a thickness corresponding substantially with the thickness of drill head center plate 10 which does not rotate about the horizontal axis and does not carry cutters.

The cutters employed are roller cutters, i.e. cutters which are rotatable about their own axes which in turn are fixedly mounted on the rotatable cutter-supporting hemispheres in suitable manner as indicated in FIGS. 8–10. The cutters are provided with cutting points or teeth preferably those provided with elongated cutting edges which in general are parallel to axes of cutter rotation. Each cutter is formed so that at least one end is conical or frusto- or semi-frustoconical shaped. Hence, cutters may be as shown in FIG. 10 namely, fusiform shaped, or of any design intermediate that of FIG. 10 and the frustoconical as in FIG. 8, preferably the latter.

Positioning of cutters on the hemispheres is such that each hemisphere has on the outer surface thereof one of at least one pair of roller cutters, a cutter of such pair being attached to each hemisphere so that, on rotation of the hemispheres in opposite directions and at the same r.p.m., at the zenith of rotation of such pair of cutters, the latter are substantially symmetrically positioned on the hemispheres and the axes of such pair of cutters lie in a plane including the axis of rotation of the hemispheres and the working pole of the drill head. In FIG. 8, the working surface or upper pole of the drill head, for convenience, may be considered as being at 165. Thus, hemisphere 15 has on its outer surface a cutter 168, hemisphere 14 has on its outer surface a longitudinally aligned cutter 169, each of these cutters constituting one of a pair of cutters which is arranged on respective hemispheres so that, on rotation of the hemispheres in opposite directions and at the same r.p.m., at the zenith of rotation of such pair of cutters, these cutters are substantially symmetrically positioned on the hemispheres, longitudinally aligned, and the axes of the cutters lie in a plane which includes the axis of rotation of the hemispheres and upper drill head pole 165 (or as another point of reference, the axis of cable 27). Preferably, the hemispheres are provided with at least a plurality of oppositely disposed but symmetrically positioned pairs of cutters, e.g. in FIG. 8 such additional pairs are constituted respectively by oppositely disposed cutters 171 and 172; 173 and 174; and 175 and 176, these four pairs being illustrative only since the number of cutters on any drill head is chosen in accordance with the size of the same. It will be noted from FIG. 8 that the cutters are mounted on their own axes so that the smaller circumferences thereof are directed, at zenith of hemisphere rotation, toward the drill head pole 165.

Referring to FIG. 8, cutters 168, 171, 173 and 175 may be considered as forming one series of a plurality of cutters disposed substantially in an imaginary line constituting a longitude of hemisphere 15, which longitude is indicated diagrammatically by the line 180, FIG. 12, the center point of which may be considered as denoting the pole of hemisphere 15. Similarly, FIG. 8, cutters 169, 172, 174 and 176 may be considered as a series of a plurality of roller cutters disposed substantially in the line constituting a longitude of hemisphere 14 indicated by line 181, FIG. 13, the center point of which indicates the pole of hemisphere 14. While longitudinal lines 180 and 181 are 180 degrees apart, it may be considered that the series of cutters 168, 171, 173 and 175 on hemisphere 15 is in longitudinal alignment with the corresponding oppositely disposed series of cutters 169, 172, 174 and 176 of hemisphere 14. Regardless of size of the drill head as a whole it is preferred to provide each of the hemispheres thereof with at least four, and desirably more, series of cutters, these series being indicated generally by 185, 186, 187 and 188, FIG. 12, the longitudinal lines of such plurality of series converging at the pole (center point of FIG. 12) of hemisphere 15 at spherical angles of about 90 degrees. Preferably, the drill head is additionally provided, intermediate each of the described series of cutters, with at least one group of trailer cutters such as 190 and 191 of FIG. 12. Alignment and other positioning of trailer cutters is substantially the same as described except that trailer cutters are placed in staggered relation with respect to cutters of adjacent series to thus afford sufficient cutter overlap to effect substantially beadless arcuate cutting by the drill head as a whole. It will be understood that when the drill is assembled, relative adjustments of the hemispheres are keyed by pinion gears 66, FIG. 1, so that when a given series of cutters on one hemisphere is at zenith a corresponding series on the other hemisphere is also at zenith, and the two series are in longitudinal alignment.

Figure 15:
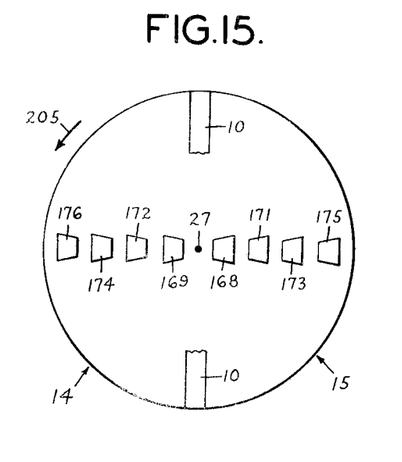
FIG. 15 is a diagrammatic plan taken on line 15—15 of FIG. 8.

Referring particularly to FIGS. 12 and 13, assume that power transmission is such that hemispheres 14 and 15 are rotated in opposite directions in accordance with the arrows 195 and 196, at the same r.p.m., and that operative tension is applied to cable 27. Cutters on one hemisphere rotate about their axes oppositely to the hemisphere itself, i.e. in the situation instanced relative rotations of hemisphere 15 and a cutter 168 are as indicated by the arrows in FIG. 9. When a cutter such as 200, FIGS. 8 and 12, comes initially into cutting engagement with the rock, because of the frusto-conical form of the cutter and the fact that the larger circumference thereof will tend to cover a greater linear distance than the smaller circumference, cutter 200 (plus the cumulative action of the other cutters in that series) tends to twist the vertical axis of the drill head out of alignment with the axis of the cable. However, on account of the described positioning of cutters on respective hemispheres, the twisting tendency effected by e.g. cutter 200 is offset by the equal and opposite reaction of the corresponding but asymmetrically positioned cutter 201, FIG. 13. Similar actions and offsetting reactions occur until a given series of cutters on hemisphere 15 passes into the zenith and becomes longitudinally aligned with a corresponding series of cutters likewise at zenith on hemisphere 14. At this instant of operation, cutters 168, 171, 173 and 175 on hemisphere 15 and cutters 169, 172, 174 and 176 on hemisphere 14 appear in elevation as in FIG. 8 and in plan as in FIG. 15; all the cutters of the two corresponding series shown in FIG. 15 are at zenith and lie in the same vertical plane and rotate about an imaginary semi-circular axis passing thru the axis of each roller of both series; and cutters of one series on one hemisphere are rotating in opposite directions to the cutters of the series on the other hemisphere. Under these conditions the cutters of one series on one hemisphere do not react against the cutters of the corresponding longitudinally aligned series of cutters on the other hemisphere, but rather act additively and in consonance so that the cutters at zenith, motivated by opposite directional movement of the hemispheres, effect incremental rotation of the drill head as a whole about the axis of cable 27. On the basis of the above assumed directions of rotation of hemispheres 15 and 14, rotation of the drill head is in the direction of arrow 205, FIG. 15.

Figure 16:
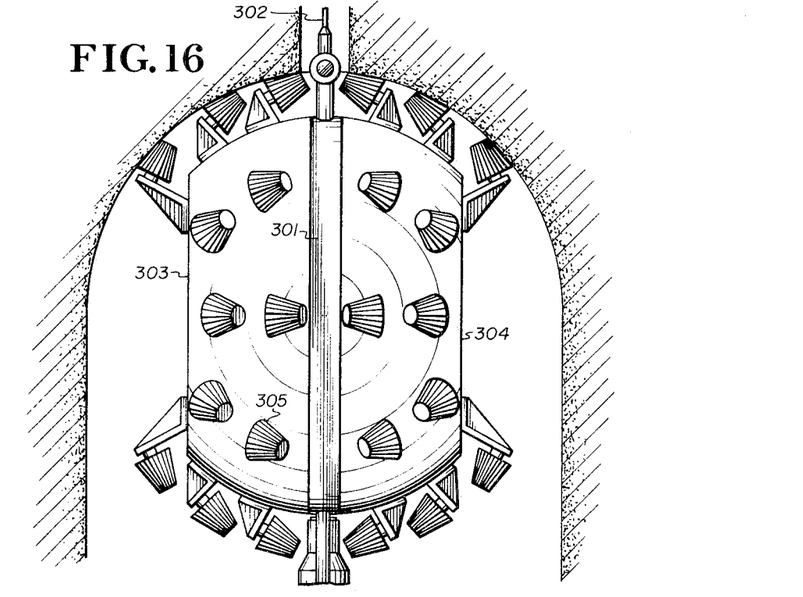
FIGURE 16 is an elevational view of a modification of the drill head of FIGURE 8, formed from truncated hemispheres.

Referring more particularly to FIGURE 16, reference numeral 301 indicates the fixed center plate corresponding to reference numeral 10 of FIGURE 8. Reference numeral 302 indicates the flexible suspending cable corresponding to reference numeral 27 of FIGURE 8. Reference numerals 303 and 304 indicate oppositely rotating truncated hemispheres corresponding to elements 14 and 15 of FIGURE 8. Reference numeral 305 indicates a frusto-conical roller cutter of the type shown at 174 on FIGURE 8.

Figure 17:
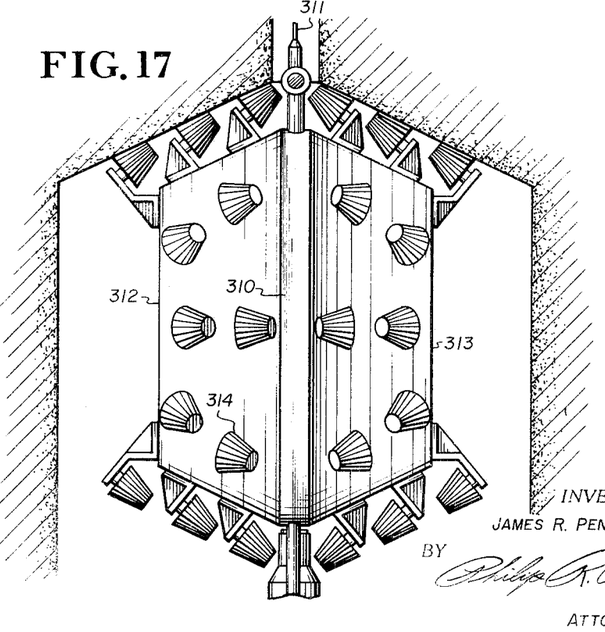
FIGURE 17 is an elevational view of another modified drill head of the type shown in FIGURE 8, utilizing frusto cones rather than hemispheres.

Referring now more particularly to FIGURE 17, reference numeral 310 denotes the center plate; reference numeral 311 denotes the flexible suspending cable; reference numerals 312 and 313 indicate oppositely rotating frusto-conical members corresponding to elements 14 and 15 of FIGURE 8. Reference numeral 314 indicates a roller cutter.

Figure 18:
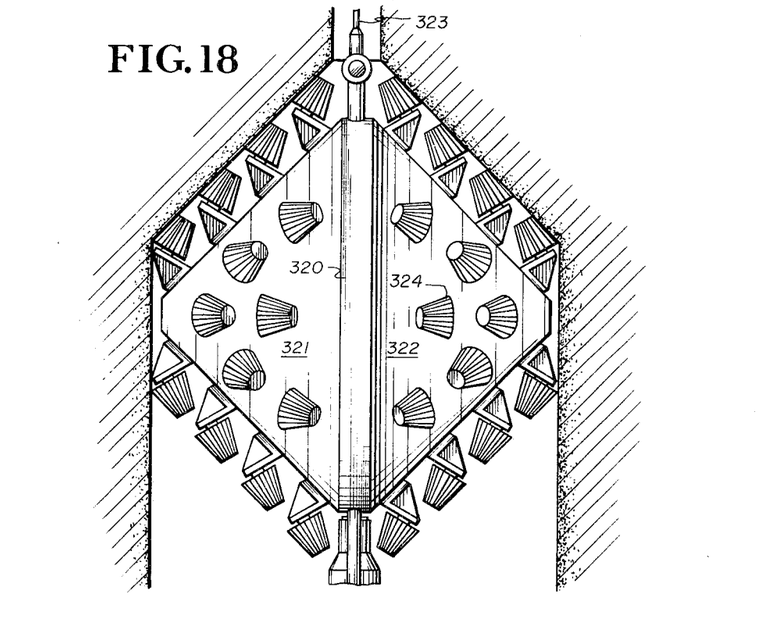
FIGURE 18 shows a further modification of the drill head of FIGURE 8, utilizing rotating cones rather than rotating hemispheres.

In FIGURE 18 reference numeral 320 indicates the center plate, reference numerals 321 and 422 indicate oppositely rotating substantially conical members corresponding to members 14 and 15 of FIGURE 8. Reference numeral 323 indicates a flexible suspending cable and reference numeral 324 indicates a roller cutter.

Figure 19:
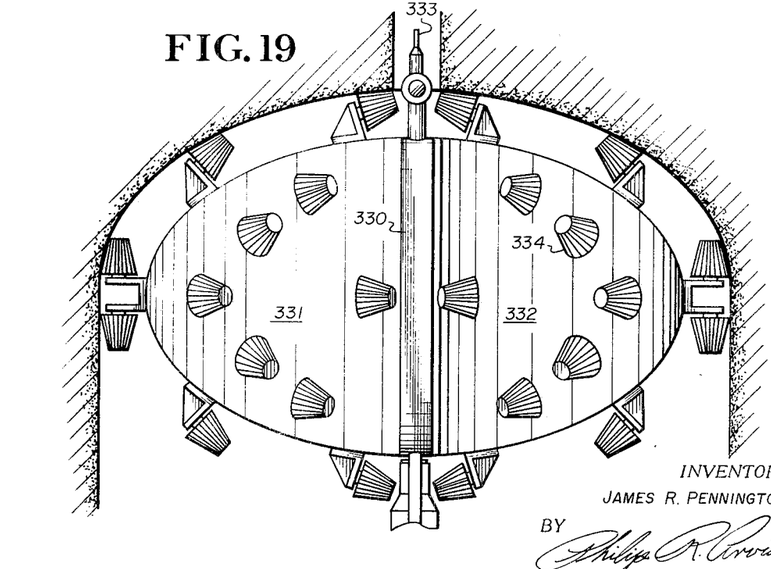
FIGURE 19 is also an elevational view of a modification of the drill head shown in FIGURE 8, using an ellipsoidal rather than spherical drill head.

Referring to FIGURE 19, reference numerals 331 and 332 indicate oppositely rotating hemi-ellipsoidal elements mounted on a central plate 330. The central plate 330 is suspended from a flexible cable 333 and provides a mount for the motors which rotate elements 331 and 332. Reference numeral 334 indicates a roller cutter.

Figure 20:
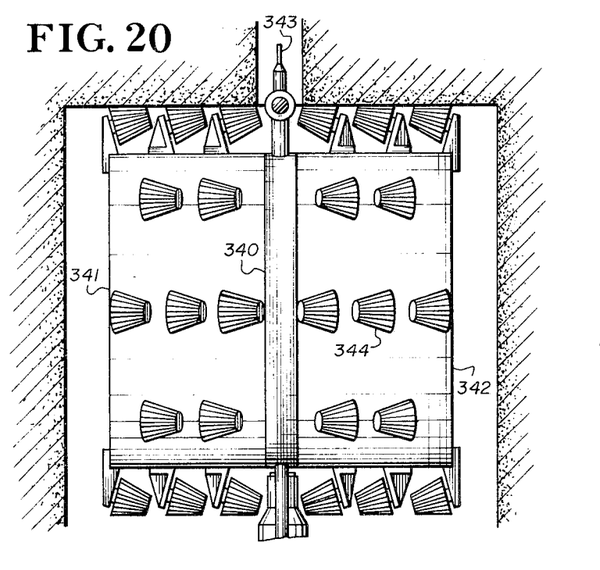
FIGURE 20 shows a still further modification of the drill head of FIGURE 8, utilizing rotating cylinders rather than rotating hemispheres.

Referring now to FIGURE 20, reference numerals 341 and 342 denote counter-rotating cylindrical members mounted on a central plate 340, which is suspended from a cable 343. Reference numeral 344 indicates a roller cutter mounted on element 342.

Figure 21:
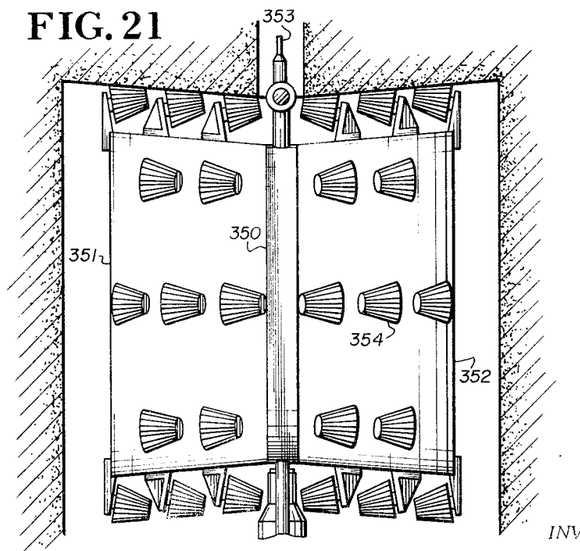
FIGURE 21 illustrates another form of utilization of frusto cones in place of the hemispheres of FIGURE 8.

Referring more particularly to FIGURE 21, reference numerals 351 and 352 denote counter-rotating frusto-conical members mounted with their small ends opposed on a central plate 350, which is suspended from a flexible cable 353. Reference numeral 354 indicates a roller cutter mounted on element 352.

Figure 22:
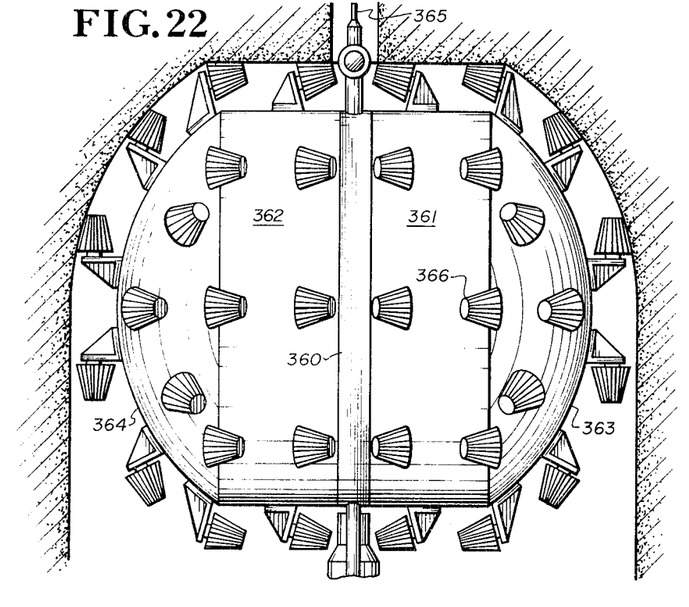
FIGURE 22 is an elevational view of a drill head similar to that of FIGURE 8 utilizing a combination of cylinders and truncated hemispheres as the rotating halves of the drill head.

FIGURE 22 illustrates a still further modification of the spherical drill head of FIGURE 8. In FIGURE 22 reference numerals 363 and 364 indicate truncated hemispheres fixedly mounted respectively on cylinder 361 and 362 which in turn are mounted on central plate 360 for counter-rotational operation. Plate 360 is suspended from flexible cable 365. This modification of FIGURE 8 is particularly useful for housing larger motors than can be housed in a spherical drill head.

Figure 23:
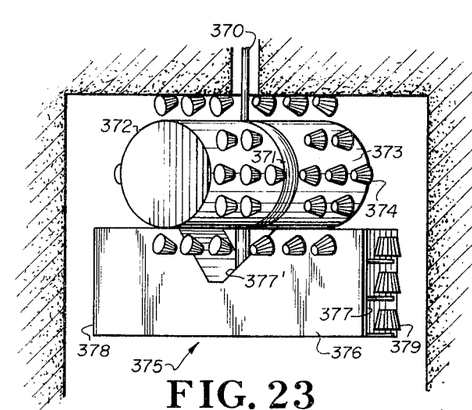
FIGURE 23 is an elevational view illustrating a combination of a drill head utilizing rotating cylindrical members rather than hemispheres in combination with a reaming and stabilizing follower element.

Referring now to FIGURE 23 this figure shows counter-rotating cylinders 372 and 373 mounted on a central plate 371 which is suspended by a swivel connection from a flexible cable 370. Roller cutters such as 374 are mounted on cylinders 372 and 373; the mounting brackets have been omitted for purposes of clarity. Following below cylinders 372 and 373 is a reamer, substantially in the form of a bar, generally denoted by reference 375. The reamer comprises a bar 376 which is centrally notched at 377' to allow passage of the cutters of cylinders 372 and 373. Mounted on the extreme ends 377 and 378 of the beam are roller cutters 379. In addition to its reaming function the reamer 375 also provides additional stability to the drill head.

Figure 24:
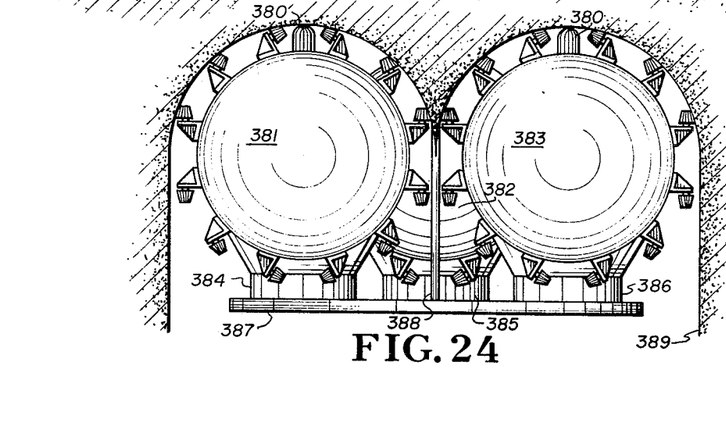
FIGURE 24 is an elevational view illustrating the utilization of a plurality of rotating spherical drill heads of the type shown in FIGURE 8 in order to drill a larger hole.

FIGURE 24 is an elevational view of a still further modification of the drill head shown in FIGURE 8. In this modification three spherical drill heads 382, 382 and 383 of the type shown in FIG. 8 are mounted for rotation on thrust bearings 384, 385 and 386 respectively, which in turn are mounted on a supporting plate 387 which is suspended from flexible supporting cable 388. The coordinate use of three spherical drill heads allows drilling of a larger hole. A burr 380 is mounted on the top of each drill head to remove the material which was removed by the pilot drill in FIGURE 8.

Figure 25:
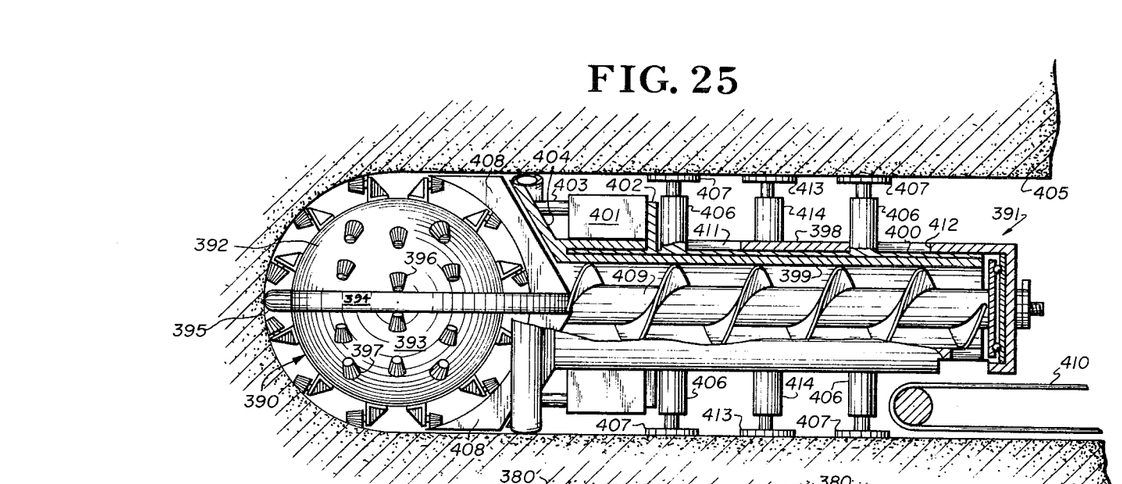
FIGURE 25 is an illustration of a rotating spherical drill head of the type shown in FIGURE 8 mounted for use in drilling horizontal passages.

Referring more particularly to FIGURE 25, this figure illustrates the use of a drill head of the type previously described, for example the drill head of FIGURE 8, in a horizontal application. In this illustrative horizontal application no flexible cable is used. Rather, the spherical drill head 390 is mounted on and propelled by conventional propulsion and cuttings-removal apparatus generally indicated by reference numeral 391. The spherical drill head is made up of two oppositely rotating hemispheres 392 and 393 mounted on a central plate 394. Central plate 394 carries a burr 395 fixedly attached thereto to remove the rock material which in a cable suspended operation would have been removed by the pilot drill. Cutters 396 and 397 are illustrative of the roller cutters mounted on the hemispheres in the same general manner as in FIGURE 8. Propulsion and cuttings-removal apparatus 391 comprises an outer casing 398 and in inner casing 399 integral therewith and spaced inwardly therefrom. In the space between outer casing 398 and inner casing 399 is an inner frame member 400 upon which casing 398, 399 is slidably mounted, the movement being accomplished by pressure from hydraulic cylinder 401, fixedly mounted on member 402 and slidably mounted on casing 398, pushing movable member 403 against the extremity 404 of casing 398, 399.

In operation, the spherical drill head 390 and propulsion and cuttings-remover 391 are placed in the desired position in a tunnel 405. Hydraulic cylinders 406 connected to inner frame member 400 are then actuated to hold inner frame member 400 in place by means of contact between pistons 407 and the adjacent wall of the tunnel 405. After pistons 407 have locked inner frame member 400 in place, hydraulic cylinder 401 is actuated and piston 403 thereof pushes casing 398, 399 forward, thus advancing drill head 390. Drill head 390 is powered by internal motors supplied with power from a cable pulled behind it (not shown). As the roller cutters remove material from the passage being driven through the rock the cuttings are picked up by rotating buckets 408 which channel the cuttings into a central screw conveyor 409 which removes them to and deposits them on conveyor belt 410.

When casing 398, 399 has been pushed forward as far as slots 411 and 412 therein will allow, pistons 407 are retracted and pistons 413 of cylinders 414 are extended against the walls of the tunnel 405. Since cylinders 414 are mounted on casing 398, 399, they lock it in place when they are extended. When pistons 407 are retracted they free inner frame member 400 for motion. Since cylinder 401 is a double-acting cylinder it can be actuated to pull member 400 forward. This procedure is then repeated over and over as the drill head advances into the rock.

It will be obvious to those skilled in the art that drill head shapes other than those shown can also be employed and further that the pattern of roller cutters on the drill head can be varied from the patterns shown as long as the previously described rotation of the drill head is achieved. Also the distance of various cutters away from the drill head can be varied, if desired, by using longer mounting brackets.

I claim:

1. A drill comprising a disk-like median plate, cutter-supporting surfaces rotatably mounted on opposite faces of said plate so as to form therewith a drill head having a pole adapted to approximate a leading point of contact with a work surface, means including a prime mover within the drill head for rotating said surfaces in opposite directions and at the same r.p.m. about a common primary axis of rotation perpendicular to said plate at the center thereof, each surface having mounted thereon roller cuter means at least one end of said cutter means being conical, frustoconical or semifrustoconical shaped, said cuter means being constructed and arranged on said surfaces so as to act, on rotation of said surfaces and pressure application of said drill head pole-wise to a work surface, to effect rotation of said head about a secondary axis of rotation including said pole and the mid-point of said plate.

2. The drill of claim 1 wherein said surfaces are substantially hemispherical and the drill is substantially spherical.

3. The drill of claim 1 wherein said pressure application is effected by tension on a cable attached to said drill.

4. The drill of claim 1 wherein said pressure application is effected by rear-mounted propulsion apparatus.

5. A drill comprising a disk-like median plate, cutter-supporting, substantially hemispherical surfaces rotatably mounted on opposite faces of said plate so as to form therewith a substantially spherical drill head having a pole adapted to approximate a leading point of contact with a work surface, means including a prime mover within the drill head for rotating said surfaces in opposite directions and at the same r.p.m. about a common primary axis of rotation perpendicular to said plate at the center thereof, each surface having mounted thereon a plurality of pairs of roller cutter means, said means having at least one end frustoconical shaped, the cutters being so positioned that the small circumferences thereof are directed at zenith of hemisphere rotation towards the pole of the drill head, a cutter of each pair being attached to each hemisphere so as on rotation of said hemispheres, at the zenith of rotation of said cutters, cutters of a pair are substantially symmetrically positioned on said hemispheres and the axes of said cutters lie in a plane including said primary axis of rotation and said pole, said cutter means being constructed and arranged on said surfaces so as to act on rotation of said surfaces and pressure application of said drill head pole-wise to a work surface, to effect rotation of said head about a secondary axis of rotation including said pole and the mid-point of said plate.

6. Apparatus for driving a raise from a gallery, into which opens a pilot bore, toward a terminus at the other end of the bore which apparatus comprises a flexible cable passing through the bore toward the gallery, a drill head rotatably attached to the gallery end of the cable, said drill head comprising a disk-like circular median plate, a cutter-supporting hemisphere rotatably mounted on opposite faces of said plate so as to form therewith a substantially spherical drill head, means including a prime mover within the drill head for rotating said hemispheres in opposite directions and the same r.p.m. about a common primary axis of rotation perpendicular to said plate at the center thereof, each hemisphere having attached to the outer surface thereof a plurality of series each comprising a plurality of frustoconical-shaped roller cutters, each series being disposed substantially in a longitudinal line of such hemisphere, said longitudinal lines of such plurality of series converging at the pole of such hemisphere, said cutters being positioned so that the smaller circumferences thereof at zenith of hemisphere rotation are directed toward point of attachment to the cable, a series on one hemisphere being longitudinally aligned with a corresponding series on the opposite hemisphere, the cutters of each series and the relative alignment of series on opposite hemispheres being constructed and arranged so that on rotation of said hemispheres, at the zenith of rotation of all cutters of aligned series, the axes of said cuters lie in a plane including said primary axis of rotation and the axis of said cable; and means for continuously applying tension to the cable to maintain the drill head in cutting engagement with the gallery end of the bore, and means for supplying energy to said prime mover.

7. The apparatus of claim 6 wherein said plurality of series of cutters comprises at least 4 series and wherein the longitudinal lines converge at spherical angles of about 90 degrees.

8. A drill comprising a relatively thin disk-like circular median plate, a cutter-supporting hemisphere rotatably mounted on opposite faces of said plate so as to form therewith a substantially spherical drill head having an upper pole adapted to approximate a leading point of contact with a work surface, a prime mover carried by said plate and lying within each hemisphere for rotating said hemispheres about a common primary axis of rotation perpendicular to said plate at the center thereof, means mounted in said plate for insuring rotation of said hemispheres in opposite directions at the same r.p.m., means for regulating the temperature of each prime mover, each hemisphere having attached to the outer surface thereof at least one series of a plurality of roller cutters disposed substantially in a line constituting a longitude of such hemisphere, a series on one hemisphere being longitudinally aligned with a corresponding series on the opposite hemisphere, the cutters of each series and the relative alignment of series on opposite hemispheres being constructed and arranged so that on rotation of said hemispheres, at the zenith of rotation of all cutters of aligned series, the axes of said cutters lie in a plane including said primary axis of rotation and said pole.

9. The drill of claim 8 in which the temperature-regulating means includes a jacket carried by said plate and associated in heat transfer relation with each prime mover, a header adjacent the lower pole of said drill head and attached to said plate and fixedly movable therewith, an inlet channel for temperature control fluid in said plate communicating with said header and with a section of said jackets, an outlet channel for temperature control fluid in said plate adjacent said upper drill head pole and communicating with another section of said jackets, said channels being adapted to provide for circulation of temperature control fluid from said header through said jackets.

10. The drill of claim 9 which includes electric motors as prime movers, a duct in said plate containing an electrical conductor connecting said header and said motors, said header comprising means for supplying temperature control fluid to said channels and electrical energy to said conductor from nonrotative sources of supply.

References Cited

UNITED STATES PATENTS

| | | | |
|---|---|---|---|
| 1,350,059 | 8/1920 | Blackwell | 175—106 X |
| 1,904,522 | 4/1933 | Pippin | 175—106 X |
| 2,095,725 | 10/1937 | Whealy | 175—106 X |
| 2,803,445 | 8/1957 | Borrowdale | 175—106 X |
| 3,190,376 | 6/1965 | Christensen | 175—104 X |
| 3,231,029 | 1/1966 | Winberg | 175—53 |

NILE C. BYERS, JR., Primary Examiner

U.S. Cl. X.R.

175—95

UNITED STATES PATENT OFFICE
CERTIFICATE OF CORRECTION

Patent No. 3,508,620

April 28, 1970

James Ronald Pennington

Figure 14:
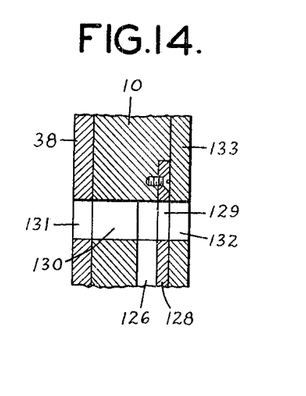
FIG. 14 is an enlarged vertical section of a detail taken on the line 14 of FIG. 2.

It is certified that error appears in the above identified patent and that said Letters Patent are hereby corrected as shown below:

Column 5, line 23, after "alignment" should read -- therewith, conduits 130, Fig. 14 are drilled thru --; line 32, "of", first occurrence, should read -- in --. Column 8, line 47, "422" should read -- 322 --. Column 10, line 26, "cuter" should read -- cutter --. Column 11, line 17, "cuters" should read -- cutters --.

Signed and sealed this 6th day of October 1970.

(SEAL)
Attest:

Edward M. Fletcher, Jr.
Attesting Officer

WILLIAM E. SCHUYLER, JR.
Commissioner of Patents